US006373822B1

(12) United States Patent
Raj et al.

(10) Patent No.: US 6,373,822 B1
(45) Date of Patent: Apr. 16, 2002

(54) DATA NETWORK PROTOCOL CONFORMANCE TEST SYSTEM

(75) Inventors: Alex Raj, Lowell; Hseu-Chuan Tsai, Chelmsford, both of MA (US); John F. McGlauphlin, Hudson, NH (US); David Snay, West Boylston, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/227,554

(22) Filed: Jan. 8, 1999

(51) Int. Cl.$^7$ .............................. H04L 12/26; H04J 3/14; G08C 15/00; G06F 11/00; G01R 31/08
(52) U.S. Cl. ...................... 370/252; 370/241; 370/250; 370/253; 714/724; 714/736; 714/738
(58) Field of Search ................................ 370/252, 250, 370/253, 241, 242, 243, 244, 245; 395/183.15, 200.68, 200.15; 714/736, 738, 724, 712, 33

(56) References Cited

U.S. PATENT DOCUMENTS

| 5,027,343 A | * | 6/1991 | Chan et al. ................... 370/250 |
| 5,375,126 A | | 12/1994 | Wallace ....................... 371/20.1 |
| 5,418,793 A | * | 5/1995 | Chang et al. ................. 714/738 |
| 5,659,555 A | | 8/1997 | Lee et al. ..................... 714/738 |
| 5,757,778 A | * | 5/1998 | Kim et al. .................... 370/252 |
| 5,787,147 A | | 7/1998 | Gunderson .................... 379/10 |
| 5,828,846 A | * | 10/1998 | Kirby et al. .............. 395/200.68 |
| 5,850,388 A | * | 12/1998 | Anderson et al. ............ 370/252 |
| 6,134,690 A | * | 10/2000 | Ivaturi et al. ................ 714/736 |

FOREIGN PATENT DOCUMENTS

| JP | 052238545 A | 9/1990 | ............ G06F/13/00 |
| JP | 05227258 A | 3/1993 | ............ H04L/29/14 |

OTHER PUBLICATIONS

Hornbeek, M., et al., "Performance and Conformance Test Tools for DPN Packet Networks," Publ. by North–Holland, Amsterdam, Neth and New York, NY USA, pp. 514–518, Conference Title: A New Communication Services: A Challenge to Computer Technology, Proceedings of the Eight International conference on Computer Communication, Munich, West Germany (1986) (Abstract Only).

* cited by examiner

Primary Examiner—Wellington Chin
Assistant Examiner—M. Phan
(74) Attorney, Agent, or Firm—Hamilton, Brook, Smith & Reynolds, P.C.

(57) ABSTRACT

A modular data network protocol conformance test system is designed to make distinct the key functionality that is required in protocol conformance testing such that the system can be reused across different platform testing, protocol testing, and network topology. As a result, in its current design, it can be used to test devices as distinct as cable modems, routers, and tag-switching routers. Consequently, the system has a packet generation module that generates send packets for transmission to the UUT (unit under test) and that analyzes the receive packets from the UUT. A separate network handling module transfers the send packets to and acquires the receive packets from the UUT. 13

20 Claims, 7 Drawing Sheets

DATA NETWORK PROTOCOL CONFORMANCE TEST SYSTEM

BACKGROUND OF THE INVENTION

Protocol conformance testing for network communication devices is relevant in a number of different environments. Manufactures must implement rigorous device verification before release for beta-testing and then finally before shipments for revenue. Moreover, especially in mission-critical applications, the end-user will typically implement its own protocol testing to ensure that the communications device is operating according to specifications and is compatible with the other network communication devices in existing networks.

The spectrum of network communication devices to which protocol testing is applied is similarly varied, extending from devices which have relatively simple behavior such as asynchronous transfer mode (ATM) switches to switches/bridges, with or without learning capabilities, and cable modems. It is most critical, however, for devices with the most complex behavior such as routers, multiprotocol routers, and tag-switching routers.

Within these network communication devices, the protocols to be tested are extensive. Hand-shaking to establish a level of service across a link between two devices represents some of the more complex types of protocols, due to the state-driven nature. For example, communicating tag-switching-enabled routers establish level of support using a tag distribution protocol. Whereas, lower-level protocols, operating nearer to the physical layer, must also be verified to determine, for example, whether the frame checksums/cyclical redundancy check (CRC) fields are properly set and whether other fields are within ranges dictated by the relevant protocol.

In the past, protocol testing systems have been designed to test individual protocols in the context of specific platforms, specific topologies, and specific states. Commonly, a workstation would be connected to the network in which the unit under test (UUT) is deployed. At the workstation, a test engineer typically hard-codes a test script that generates communications on the network to essentially interrogate the UUT's regarding their behavior under the protocol of interest.

SUMMARY OF THE INVENTION

The problem with this hard-coding technique for generating the scripts used to test network communications device protocol conformance surrounds the fact that the test engineer must typically write a separate script for each device, each implementation of that device, each protocol that must be tested, and each topology on which the device operates. In the context of the situation where many network communications devices must be tested over periods of time, commonality exists between protocols executed by the devices, network topologies, and the numerous test scripts that are developed, but due to the situation-specific nature of the scripts and limitations on the documentation of these scripts, there is little opportunity to reuse the core intelligence from one device-test to another.

The present invention is directed to a modular data network protocol conformance test system. The modularity at the software module, procedure, and/or object level is designed to make distinct the key functionality that is required in protocol conformance testing such that the system can be reused across different platform testing, protocol testing, and network topologies. As a result, in the current design, it can be used to test devices as distinct as cable modems, multiprotocol routers, and tag-switching routers.

In general, according to one aspect, the invention concerns a data network protocol conformance testing system. It comprises a packet generation module that generates send packets for transmission to the UUT (unit under test) and that analyzes the receive packets from the UUT. A separate network handling module transfers the send packets to and acquires the receive packets from the UUT.

The system can be deployed in a number of implementations. The modules can run on a workstation computer that directly interfaces with a network on which the UUT operates. Alternatively, interface can be achieved between the workstation executing the modules and the UUT via a packet generating router. The advantage of this latter system is that the intelligence required to transfer the packet or frame, for example, onto the network can essentially be out-sourced to this separate network communications device, i.e., router.

In a preferred embodiment, an input definition file is used to hold a testing value section that contains fields of the send packets. This input definition file preferably also has protocol header information that determines the encapsulation for the send packets. Further, the testing value section can comprise minimum and maximum values to be used in specified fields of the send packets in addition to incrementing values used so that the value of the field is changed, incrementally, in successive packet transmissions.

In order to test more complex protocol operation, the input definition file also preferably has state definition information. The packet generation module extracts state packets for transmission to the UUT so that protocol conformance in a specific state, or proper state-transition behavior of the UUT can be tested.

Also according to the preferred embodiment, an output-definition file is further included containing expected values in the receive packets. The packet generation module accesses this output definition to analyze the receive packets from the UUT for protocol conformance.

In general, according to another aspect, the invention also features a data network protocol conformance test method. This method comprises forming the send packets for transmission to a UUT and then transferring the send packets to a network handling module, which transfers the send packets onto the network. Receive packets are then acquired and transferred to the packet generation module where they are again analyzed for protocol conformance.

Finally, the invention also concerns an article of manufacturer comprising a machine readable medium holding a computer program. This computer program comprises the packet generation module which enables a computer workstation to generate send packets for transmission to the UUT and that then analyzes the receive packets from that unit. The program further comprises a network handling module that enables the workstation to transfer and receive the send and receive packets to and from the UUT.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
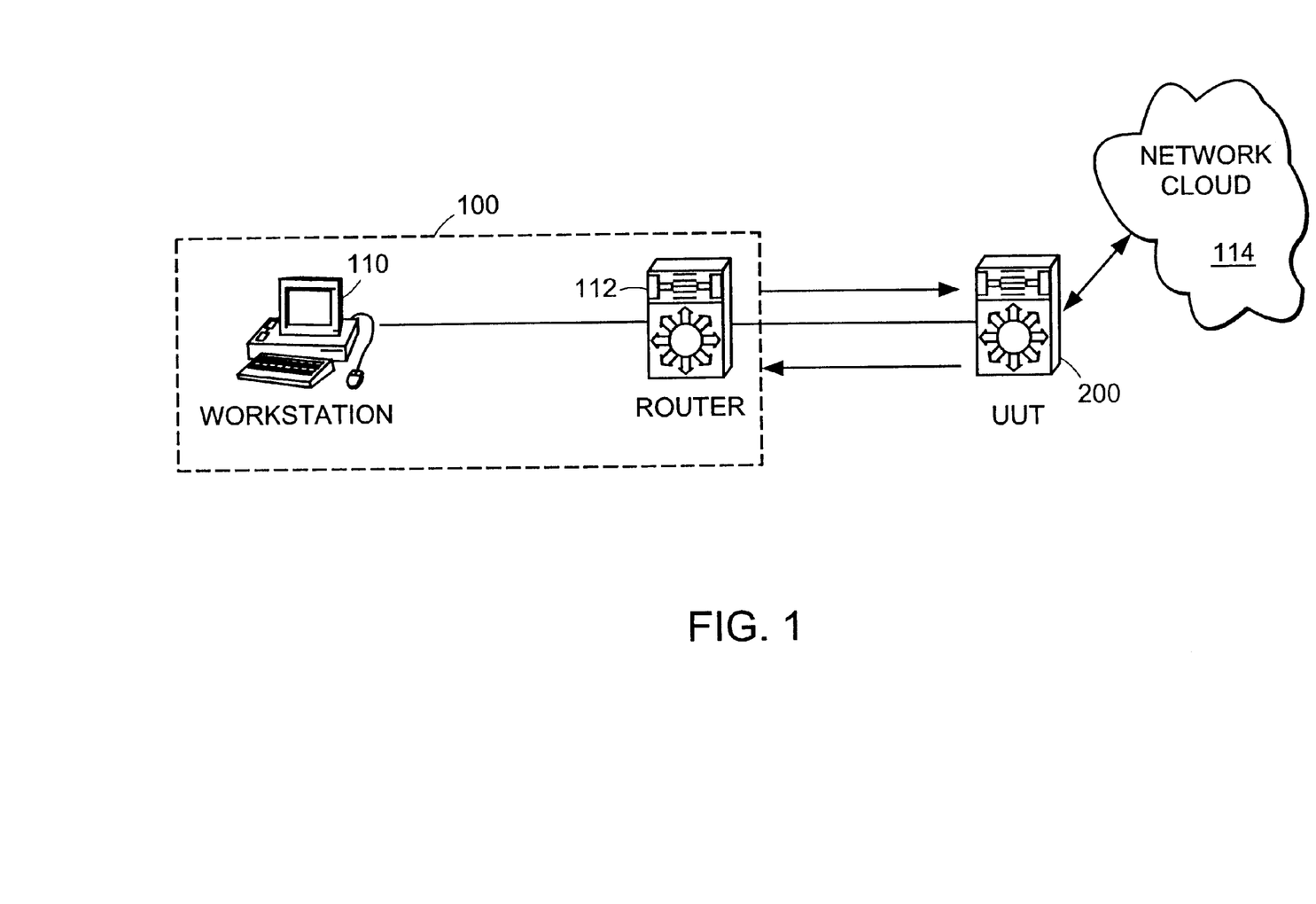
FIG. 1 is a block diagram illustrating a test bed configuration in which the data network protocol conformance testing system of the present invention is implemented.

FIG. 1 is a block diagram illustrating a typical environment in which the present invention is deployed. A computer workstation 110 and packet generating router 112 function together to act as the data network protocol conformance testing system 100. The router 112 interfaces with the network in which the UUT (unit under test) 200 operates.

Depending on the implementation, the packet generating router 112 has a common link with UUT 200 or is connected indirectly through other data network communication devices. Further, the UUT 200 may be additionally connected to other data communication devices in network cloud 114.

The testing performed by system 100 is described as protocol conformance testing. This classification includes, for example, protocol finite state machine testing in which the protocol state machine of the UUT 200 is tested for proper transition from one state to another in response to external stimuli, such as state packets sent from system 100. Additionally, negative testing of the protocol state machine UUT 200 is provided in the preferred embodiment. Conditions for negative protocol testing are created with abnormal state packet sequences or packets with erroneous or invalid fields that relate to state transition. Protocol data structure testing is also contemplated for testing by system 100. Here, fields of packets containing data values at upper and lower limits as dictated by specifications are sent. Further, full structure or linked list implementation of data structures is tested by sending packets with single or multiple linked value formats. Extreme and out-of-bound values are also sent in the packets and the responses of the UUT 200 are verified. Abnormal or illegal values can be sent by system 100 to the UUT 200 to verify the operation of the database. Further, the database handling is tested by populating it to a large size and verifying normal operations. Finally, interoperability is tested along with compatibility with different versions of protocols and protocols of different devices.

Figure 2:
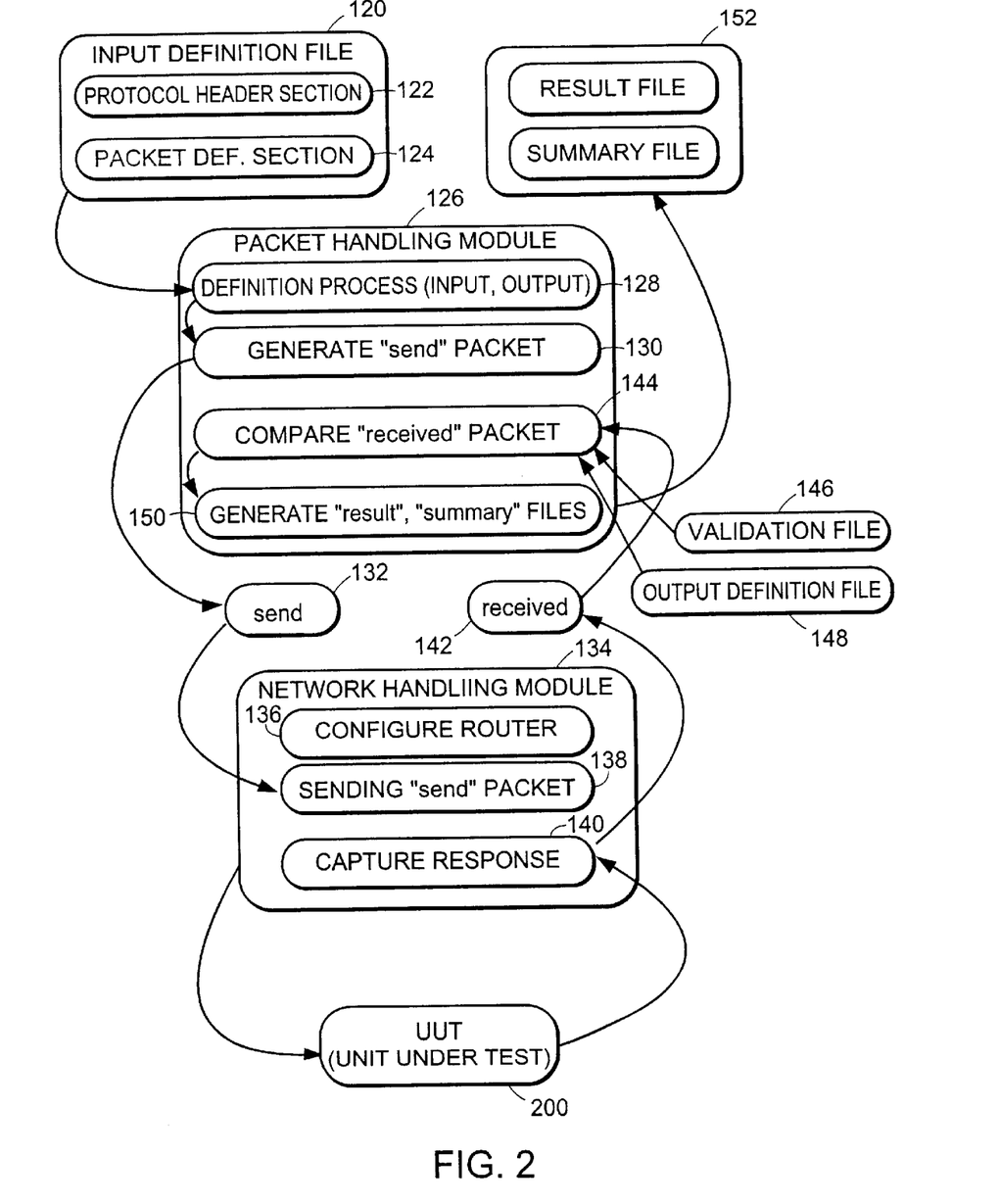
FIG. 2 is a software architecture diagram illustrating the organization of the definition files, packet handling module, and network handling module according to the present invention.

FIG. 2 is a software architecture diagram illustrating the modularity of the software running on the workstation 110.

The software comprises an input definition file 120, which dictates both the construction of the packets that are sent to the UUT 200 and the information necessary to get those packets to the UUT, i.e., encapsulation. As such, the input definition file 120 comprises a protocol header section 122. This contains, in the preferred embodiment, hexadecimal (HEX) formatted testing protocol header data. In a specific example of the system 100 being connected to the UUT 200 via an CSMA/CD link, the protocol header section contains the header information, source and destination information, for the CSMA/CD frame that conveys the packets to the UUT 200.

The packet definition section 124 has both a test values section, which contains the fields of the send packet, and state definition section, which is the state packets that are required to be sent to the UUT 200 to get it to the particular state, in which the protocol testing conformance is to take place.

The following sets forth organization of the testing values section of the packet definition section 124 of the input definition file 120. Each line defines a field of the packet. As a result, if a packet has 50 fields, then there will be 50 lines in the testing values section of the packet definition section 124. In the preferred embodiment, the format of each line is:

name length type delta MIN MAX SET{ . . .} INCR

In this illustrated implementation, the following rules are used when constructing each line.

- the first four fields are mandatory, the fields order must be followed.
- name is the field's name. e.g. Version_number.
- length is this field's length, number of bytes.
- type specifies this field's data type. NUM (number), CHAR (character), BIT are the data types.
- delta is used for the negative test that are below and above the data range boundary. It is based on MIN/MAX or SET, depending on which one is used. The first/last value in the MIN/MAX or SET data range minus/plus the delta value will be the first/last testing data. To create one testing value of the field, use 0 as delta with one testing value defined in either SET or MIN/MAX value (MIN=MAX=testing value).
- MIN, MAX, SET, INCR are keywords; the data must follow them and have a space separator. The MIN/MAX pair or SET must exist.
- MIN/MAX specifies the minimum/maximum value of this field.
- SET specifies a set of test values, separated by space within "{ }".
- If SET is present, its value(s) override MIN/MAX for use. ie. SET {2 7 20}
- INCR specifies the increment of MIN/MAX. The default value is 1.

Figure 3:
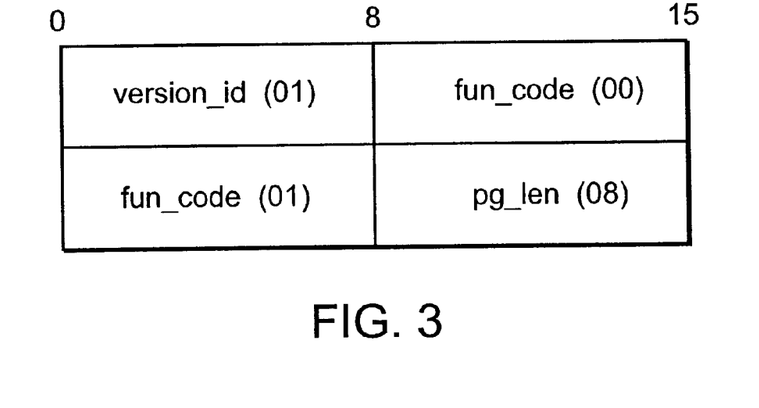
FIG. 3 shows exemplary packet field definitions in the packet definition section of the input definition file.

FIG. 3 illustrates a packet constructed from the following definition file to illustrate a specific example:

version_id 1 NUM 0 MIN 0 MAX 5 SET {1} fun_code 2 NUM 0 SET {1} pg_len 1 NUM 0 MIN 8 MAX 8

Returning to FIG. 2, the state definition section of the packet definition section 124 contains the state packets that are required to initiate the change-overs required to get the UUT 200 from its initial state to the particular state in which protocol testing is desired, for example, or to test state transitions themselves. Such operation is relevant to test, for example, the hand-shaking involved between routers to establish some level of service across the link. For example, these packets are sent between the packet generating router 112 to the UUT 200 to first open a link between the devices and then establish some level of data transfer such as tag switching between the router 112 and UUT 200.

In one implementation, each line of the state definition section of the input definition file is formatted as follows:

STA_# state_name<state definition packet files>

■STA_#, STA_ is fixed format, # are sequential line by line.

Figure 4:
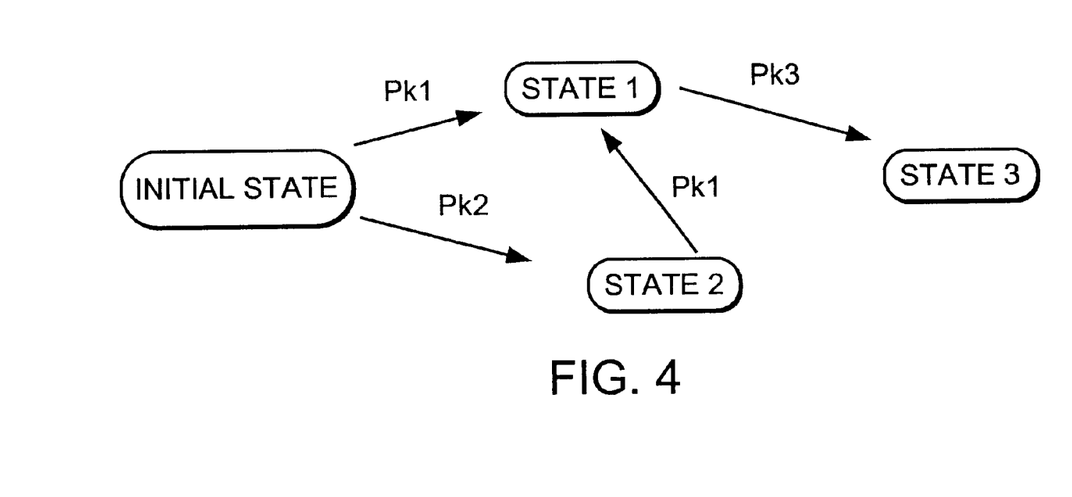
FIG. 4 is an exemplary state diagram of a UUT.

FIG. 4 illustrates one example. To get UUT 200 into State3 requires it to have received Pk1 and Pk3, in order. The state definition section thus has at least two state definition packet files. One for PkI and one for Pk3. Or, the UUT can also be transitioned with packets Pk2, Pk1 and Pk3. In this case, the files needs at least three state definition packet: Pk1, Pk2, Pk3.

A complete state definition section is as follows:

STA_0 Initial
STA_1 State1 Pk1
STA_2 State1 Pk2 Pk1
STA_3 State2 Pk2
STA_4 State3 Pk1 Pk3
STA_5 State3 Pk2 Pk1 Pk3

Pk1, Pk2, Pk3 are the state packet file's file name.

For example, the line number 5 (STA_5) is interpreted as: the UUT to get to the State3, it must receive packets Pk2, Pk1 and Pk3.

Returning to FIG. 2, the input definition file 120 is used by the packet handling module 126. The packet handling module has a definition process 128, which is used to access the input definition file 120. This process passes the information from the file to generation process 130. This creates the state packets and packets with the testing values, which are then placed in a send buffer 132.

A network handling module 134 successively picks the packets out of the send buffer 132, preferably in a first-in-first-out basis, for transmission to the UUT 200.

In the context of the example illustrated in FIG. 2, the network handling module also has a configure process 136 that configures the packet generating router 112 to receive the send packets from the workstation 110 and then send them to the UUT 200. This embodiment has certain advantages in complexity of implementation since details concerning formation of the frames, for example, for transmission to the UUT, is implicit in the capabilities of the router 112.

In an alternative embodiment, where the workstation 110 is directly interfaced to the network on which the UUT 200 is operating, via a network interface card, for example, the sending sent packet process 138 must have the additional intelligence necessary to form the data transmission structure to get the packet to the UUT 200.

Also in the network handling module 134 is a capture response process 140. This, in the illustrated example of FIG. 1, interfaces with the packet generating router 112 to record and capture the response packets received by the router 112 from the UUT 200. These response packets are placed by the capture response process in received buffer 142.

The packet handling module 126 has a compare received packet process 144. This process 144 accesses a validation file 146 and output definition file 148.

The validation file 146 identifies the output definition file 148. It also specifies the fields of the receive packet(s) that are to be verified by the packet handling module 126. If the field is not identified by the validation file 146, then it is ignored by the packet handling module 126.

The output definition file is formatted, in one implementation, identically to the input definition file 120. Each line of the testing values section identifies a field to be tested in the receive packets. The line format is as follows:

name length type delta MIN MAX SET{ . . . } INCR

The output definition file 148 also has a state packet section in the packet definition section. Each line contains one of the state packets. The difference between the two files, however, is that the input definition file identifies multiple test packets whereas the state packet section of the output definition file 148 defines only one valid packet. Thus, each field in the state packet section only contains one value.

Once the compare received packet process 144 has analyzed the receive packets, the results are passed to a generate result, summary file process 150. This process creates the result and summary file 152 that the tester reviews to assess the performance of the UUT 200.

Figure 5:
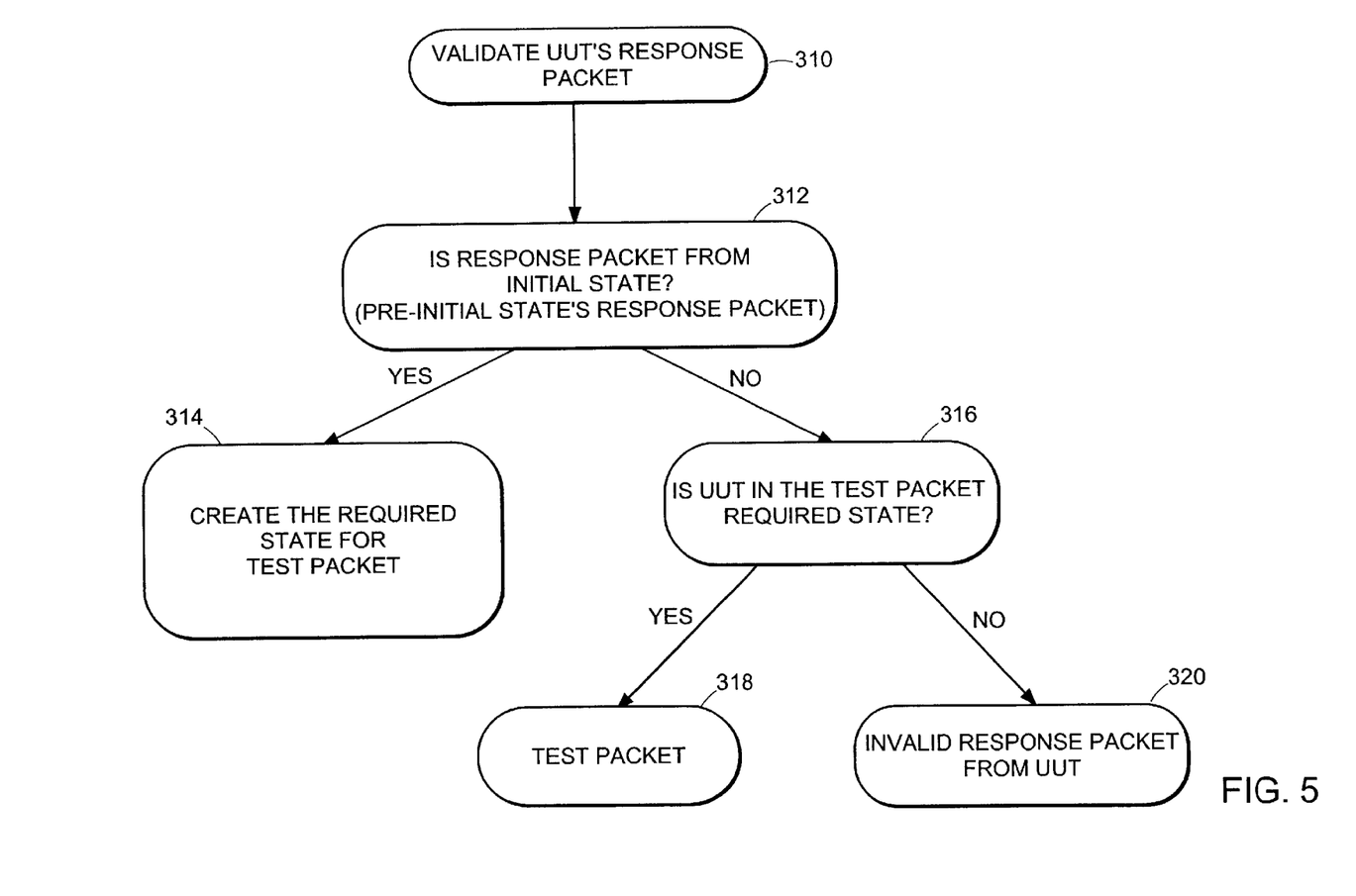
FIG. 5 is a flow diagram illustrating the operation of the inventive system to control UUT state.

FIG. 5 is a flow diagram illustrating the UUT state control/validation process performed by the packet handling module 126. Initially, the response or receive packet from the UUT 200 is analyzed by the packet handling module 126 in step 310. It is then queried whether or not this response packet is from the expected initial state of the UUT 200. If the UUT 200 is determined to be at its expected, initial state, then the state packets are sent from the state packet section of the packet definition section 124 contained in the input definition file 120. This creates the required state for sending further test packets in step 314. Alternatively, if in step 312, the response packet is determined not to be from the initial, expected state, it is then determined whether or not the UUT 200 is in the state required for the test packet in step 316. That is, it is queried whether the UUT 200 is already in the state for the test packets defined in the testing values section of the input definition file 120. If so, then the test packet is sent in step 318. Alternatively, an invalid state is indicated in step 320.

Figure 6:
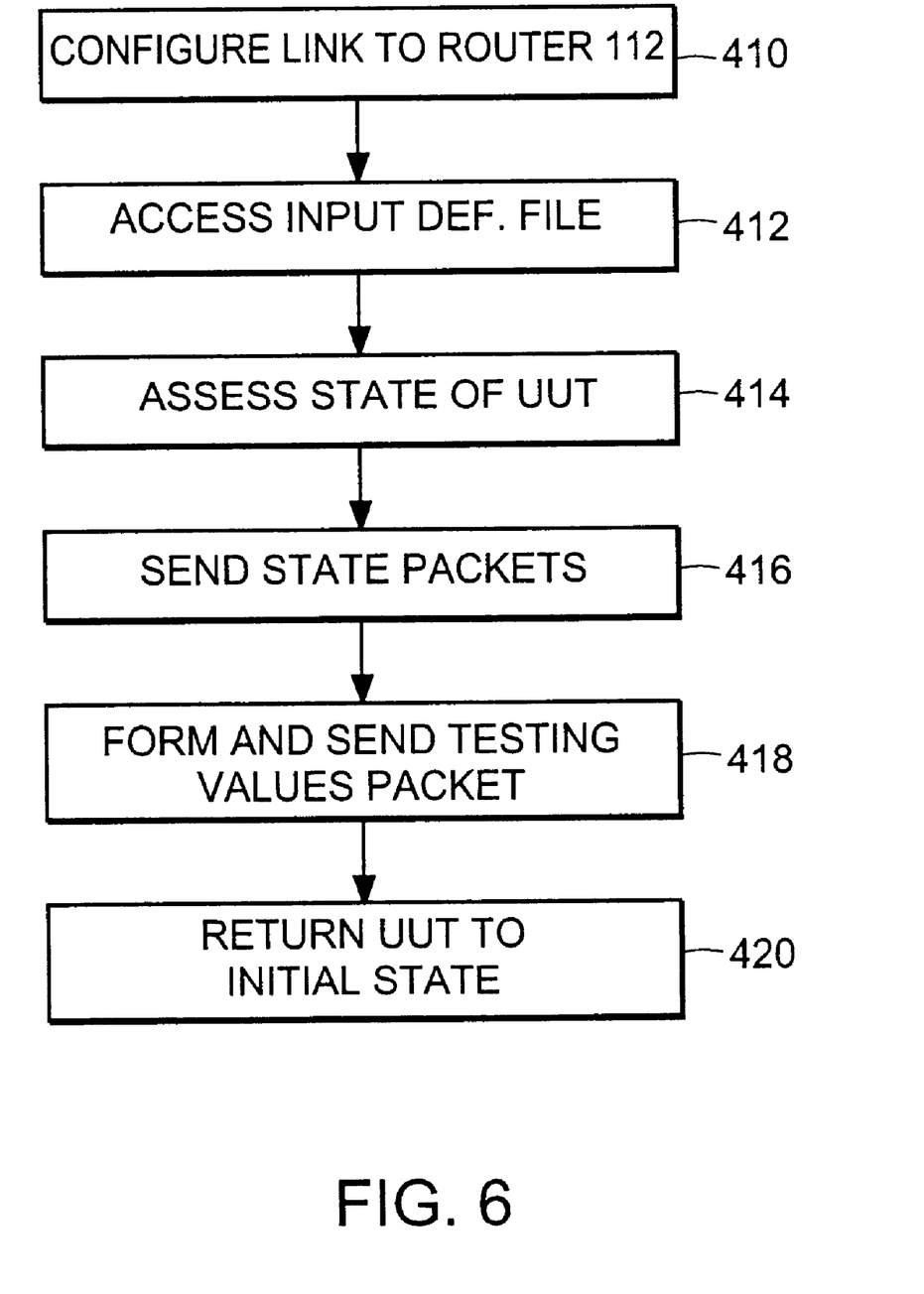
FIG. 6 is a flow diagram illustrating the steps performed by the protocol performance testing system of the present invention.

FIG. 6 is a flow chart illustrating the overall operation of the protocol conformance testing system. First, the link to router 112 is configured in step 410, Next, the packet handling module 126 accesses the input definition file 210. The state of the UUT 200 is interrogated in step 414, and the packet handling module 126 successively picks the state packets out of the state packet definition section of the packet definition section 124 of the input definition file 120, passes the state packets to the send buffer 132 where they are transmitted to the UUT 200. As described in FIG. 5, this process get the UUT to the required state. State transitions of the UUT are tested by analysis of the response packets. The response packets are stored to the result and summary file 152 by the compare receive process 144 and file generation process 150. In parallel, the generate send packet process 130 creates the testing values packets from the testing values section of the packet definition section 124. These are also placed in the buffer 132 for transmission to the UUT in step 418. -The receive packets are then processed with the compare receive packet process 144. Finally, in the preferred embodiment, after all the testing values packets have been sent, the UUT 200 is returned to its initial state by sending the required state packets in step 420.

FIGS. 7–11 show a number of other bed configurations for the protocol conformance testing system.

Figure 7:
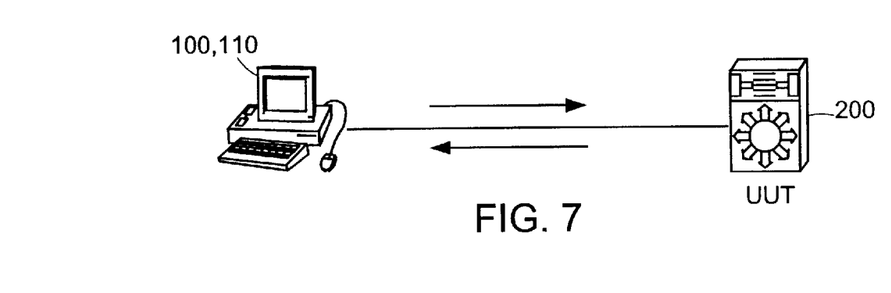
FIGS. 7–11 show other test bed configurations in which the system of the present invention is implemented.

In FIG. 7, the workstation 110 is configured to interface directly with the network on which the UUT 200 operates. Relative to FIG. 1, the intervening router 112 has been removed. This configuration requires that the combined workstation 110/system 100 have the network interface card necessary to communicate on the network or via a console port of the UUT 200, for example. Further, it complicates, somewhat, the construction of the network handling module since the particularities of packet construction and encapsulation must now be included in this module 134.

Figure 8:
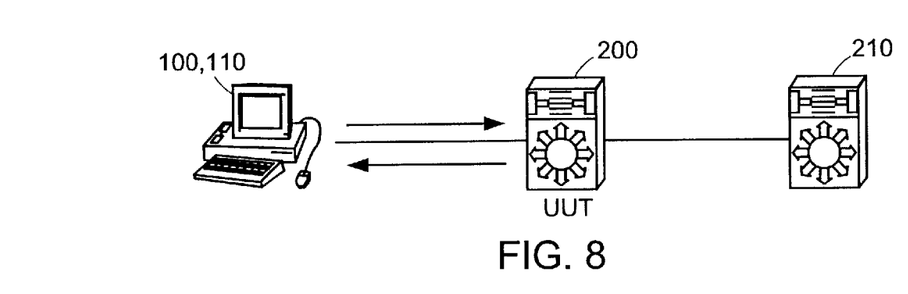

FIG. 8 shows another test bed in which the workstation 100, or system 110, is connected directly to the UUT 200. An additional router is also connected to the network. In this configuration, the UUT's behavior with the additional router 210 is confirmed.

Figure 9:
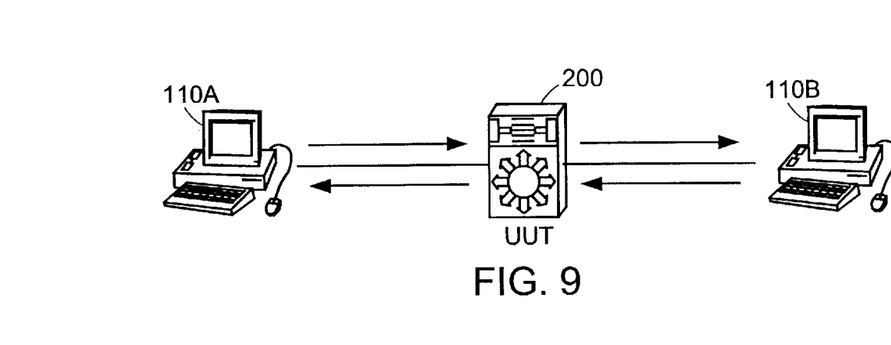

FIG. 9 shows still another configuration in which two protocol conformance testing systems, workstations 110A, 10B, are used to test a single UUT 200. In the specific illustrated embodiment, both systems 110A, 110B are connected directly to the UUT's network.

Figure 10:
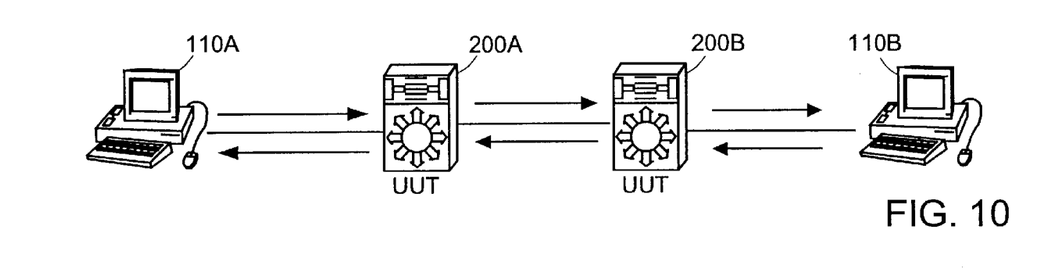

In the FIG. 10 test bed, two systems 110A, 110B are used to test two UUT's 200A, 200B. This test bed is useful to test interoperability, especially for new protocols.

Figure 11:
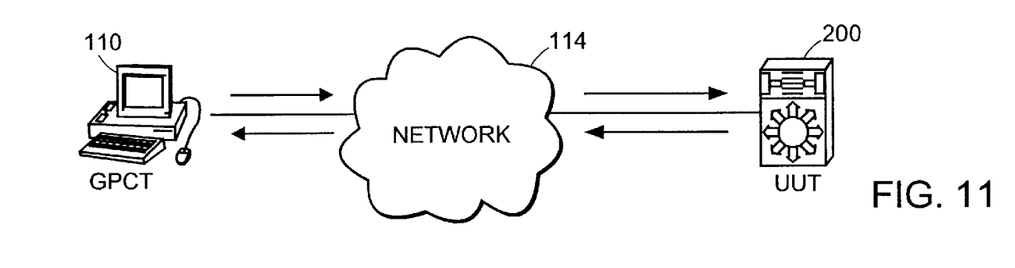

FIG. 11 shows a test bed configuration in which the testing system 110 is connected to the UUT 200 via a network 114. This system is useful for a manufacturer, for example, to test a UUT 200 at a customer facility. The intervening network 114 is conveniently the InterNet, for example.

Figure 12:
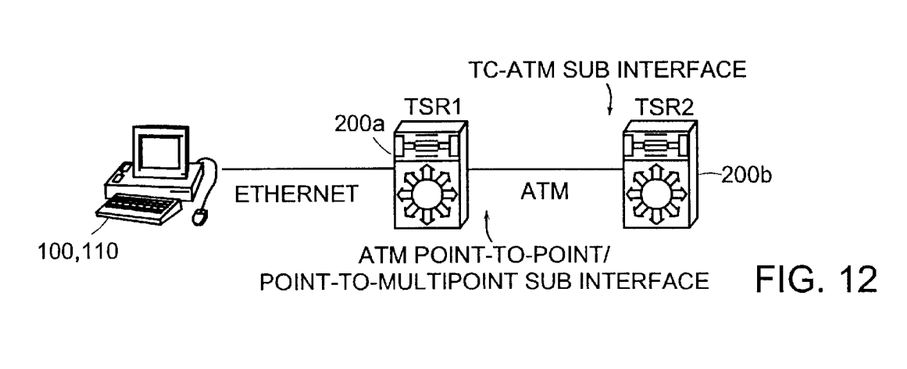
FIG. 12 shows an implementation in which the inventive system is used to test the tag distribution protocol of a tag switching router for conformance.

FIG. 12 shows still another test bed configuration. In this example, the UUTs are two tag switching routers 200A, 200B with a mutual ATM link. This system is used to test ATM tag distribution protocols. For example, ATM TDP is using the path VPI=0, VCI=32 to communicate between two TC-ATM interfaces. This path (0, 32) and the TDP sessions get created automatically, when a TC-ATM interface is configured on both sides of the ATM link. In order to avoid the automatic creation of the TDP session, just one side of the ATM link is configured as a TC-ATM sub interface and other side is configured as a regular point-to-point or point-to-multipoint sub interface. The TC-ATM interface configuration already created an unidirectional path with VPI=0, VCI=32. So an ATM PVC is configured with the same VCD, VPI and VCI numbers at the point-to-point or point-to-multipoint subinterface. Now the workstation 100, 110, pings the TC-ATM through the VPI=0 and VCI=32 path. The test bed is ready to open the ATM TDP.

In the above test bed, routing protocols such as OSPF will not work between TSR1 200A and TSR2 200B through the ATM link, because the routing protocols will not see them as neighbors. So if the routing protocol is OSPF, then configure 'ip ospf network broadcast' on both sides of the ATM link. The routing protocol discovers the TSR1 and TSR2 as neighbors from the broadcast messages.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A data network protocol conformance testing system, comprising:
   a packet handling module that generates send packets for transmission to a unit under test, and that analyzes receive packets from the unit under test;
   a network handling module that transfers the send packet to and acquires the receive packets from the unit under test; and
   an input definition file that comprises a testing values section dictating fields of the send packets and protocol header information, the packet handling module building the send packet with the testing values and encapsulating the send packet using the protocol header information.

2. A system as described in claim 1, wherein the packet handling module and network handling module ran on a workstation computer that directly interfaces with a network on which the unit under test operates.

3. A system as described in claim 1, wherein the packet handling module and network handling module run on a workstation computer that interfaces with a network on which the unit under test operates via a packet generating router.

4. A system as described in claim 1, wherein the testing values section of the input definition file comprises minimum and/or maximum values to be used in specified fields of the send packets.

5. A system as described in claim 1, wherein the testing values section of the input definition file comprises incrementing values to be used to modify the same fields between successive send packets.

6. A system as described in claim 1, wherein the packet handling module interprets incrementing values in the testing values section of the input definition file as instructions to generate successive packets in which the value in the field specified by the incrementing value is incremented.

7. A system as described in claim 1, wherein the input definition file further comprises a state definition section, the packet handling module extracting state packets for transmission to the unit under test.

8. A system as described in claim 7, wherein packet handling module interrogates the unit under test after transmission of the state packets to assess the state of the unit under test.

9. A system as described in claim 1, further comprising an output definition file defining expected values in the receive packets, the packet handling module accessing output definition file to analyze the receive packets from the unit under test.

10. A system as described in claim 1, further comprising a validation file that identifies fields of the receive packets that are to be validated.

11. A data network protocol conformance testing system, comprising:
    packet handling means for generating send packets for transmission to a unit under test, and analyzing receive packets from the unit under test;
    network handling means for transferring the send packet to and acquiring the receive packets from the unit under test; and
    input definition means that comprises a testing values section dictating fields of the send packets and protocol header information, the packet handling means building the send packet with the testing values and encapsulating the send packet using the protocol header information.

12. A protocol conformance test method, comprising:
    forming send packets in a packet handling module for transmission to the unit under test;
    transferring the send packets to a network handling module;
    transmitting the send packet to the unit under test;
    acquiring receive packets originating from the unit under test which were generated in response to the send packets;

transferring the receive packets to the packet handling module;

analyzing the receive packets for protocol conformance; and building the send packets using testing values and encapsulating the send packets using protocol header information contained in an input definition file.

13. A method as described in claim 12, further comprising directly interfacing with a network on which the unit under test operates.

14. A method as described in claim 13, further comprising interfacing with a network on which the unit under test operates via a packet generating router.

15. A method as described in claim 12, further comprising identifying minimum and/or maximum values to be used in specified fields of the send packets in the input definition file.

16. A method as described in claim 12, further comprising defining incrementing values to be used to fields in successive send packets in the input definition file.

17. A method as described in claim 16, further comprising interpreting the incrementing values in the input definition file as instructions to generate successive packets in which the value in the field specified by the incrementing value is incremented.

18. A method as described in claim 12, further comprising sending state packets to the unit under test to attain a desired state for testing.

19. A method as described in claim 18, further comprising interrogating the unit under test after transmission of the state packets to assess the state of the unit under test.

20. An article of manufacture comprising a machine readable medium holding a computer program which comprises:

a packet handling module for enabling a computer workstation to generate send packets for transmission to a unit under test, and that analyzes receive packets from the unit under test;

a network handling module for enabling the computer workstation to transfer the send packet to and acquire the receive packets from the unit under test; and an input definition file that comprises a testing values section dictating fields of the send packets and protocol header information, the packet handling module further enabling the computer workstation to build the send packet with the testing values and encapsulating the send packet using the protocol header information.

* * * * *

UNITED STATES PATENT AND TRADEMARK OFFICE
CERTIFICATE OF CORRECTION

PATENT NO.   : 6,373,822 B1
DATED        : April 16, 2002
INVENTOR(S)  : Raj et al.

It is certified that error appears in the above-identified patent and that said Letters Patent is hereby corrected as shown below:

Column 8,
Line 8, delete "ran" and insert -- run --.

Column 9,
Line 11, delete "as described in claim 13" and insert -- as described in claim 12 --.

Signed and Sealed this

Twenty-ninth Day of July, 2003

JAMES E. ROGAN
*Director of the United States Patent and Trademark Office*